(12) United States Patent
Kennedy et al.

(10) Patent No.: US 9,220,040 B2
(45) Date of Patent: Dec. 22, 2015

(54) FEMTO-GATEWAY, A CELLULAR TELECOMMUNICATIONS NETWORK, AND A METHOD OF IDENTIFYING A HANDOVER TARGET FEMTOCELL BASE STATION

(75) Inventors: Irwin O. Kennedy, Londonderry (GB); Philip C. Sapiano, Corsham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 90 days.

(21) Appl. No.: 14/234,551

(22) PCT Filed: May 29, 2012

(86) PCT No.: PCT/EP2012/002300
§ 371 (c)(1),
(2), (4) Date: May 6, 2014

(87) PCT Pub. No.: WO2013/013734
PCT Pub. Date: Jan. 31, 2013

(65) Prior Publication Data
US 2014/0242992 A1 Aug. 28, 2014

(30) Foreign Application Priority Data
Jul. 25, 2011 (EP) .................................... 11290336

(51) Int. Cl.
*H04W 36/00* (2009.01)
*H04W 48/20* (2009.01)
*H04W 36/30* (2009.01)
*H04W 84/04* (2009.01)

(52) U.S. Cl.
CPC .......... *H04W 36/0083* (2013.01); *H04W 48/20* (2013.01); *H04W 36/30* (2013.01); *H04W 84/045* (2013.01)

(58) Field of Classification Search
CPC ............ H04W 36/30; H04W 36/0083; H04W 84/045; H04W 48/20
USPC .......................... 455/436, 438, 439, 444, 440
See application file for complete search history.

(56) References Cited

U.S. PATENT DOCUMENTS

| 7,787,880 B2 * | 8/2010 | Ueda .............................. 455/439 |
| 2007/0097939 A1 * | 5/2007 | Nylander et al. ............. 370/338 |

(Continued)

OTHER PUBLICATIONS

Qualcomm Europe, "Mechanism for pre-Rel-9 UE inbound mobility," $3^{rd}$ Generation Partnership Project (3GPP), 3GPP TSG RAN WG3, R3-091870, pp. 1-9, XP050353235, Shenzhen, China, Aug. 24-28, 2009.

(Continued)

*Primary Examiner* — Khai M Nguyen
(74) *Attorney, Agent, or Firm* — Fay Sharpe LLP

(57) ABSTRACT

A method is provided of identifying a handover target femtocell base station from among multiple femtocell base stations. The method comprises: (a) measuring the characteristic of the handover target femtocell base station to provide a first measured value of the characteristic; (b) then identifying as handover candidate femtocell base stations a first set of femtocell base stations all having that first characteristic value; (c) then changing the characteristic of selected femtocell base stations in the first set; (d) then measuring the characteristic of the handover target femtocell base station to provide a further measured value of the characteristic; (e) then identifying as a reduced set of handover candidate femtocell base stations each femtocell base station in the first set having the further measured value of the characteristic; (f) then checking whether the number of femtocell base stations in the reduced set of handover candidate femtocell base stations is one, and upon determining that the number of femtocell base stations in the reduced set is greater than one, taking the reduced set as the first set in repeating steps (c), (d) (e) and (f).

15 Claims, 6 Drawing Sheets

(56) References Cited

U.S. PATENT DOCUMENTS

2010/0150109 A1* 6/2010 Bradley et al. .............. 370/331
2011/0243097 A1* 10/2011 Lindqvist et al. ............ 370/331

OTHER PUBLICATIONS

Qualcomm Europe, "Considerations on enabling Active hand-in for legacy UEs," $3^{rd}$ Generation Partnership Project (3GPP), 3GPP TSG RAN WG3, R3-090842, pp. 1-4, XP050341218, Seoul, Republic of Korea, Mar. 23-26, 2009.
Universal Mobile Telecommunications System (UMTS); Mobility procedures for Home Node B (HNB); Overall description; Stage 2 (3GPP TS 25.367 version 9.4.0 Release 9), pp. 1-16, Jun. 2010.
"Universal Mobile Telecommunications System (UMTS); UTRAN architecture for 3G Home Node B (HNB); Stage 2 (3GPP TS 25.467 version 9.3.0 Release 9)," pp. 1-35, Jun. 2010.
International Search Report for PCT/EP2012/002300 dated Jun. 29, 2012.

* cited by examiner

FEMTO-GATEWAY, A CELLULAR TELECOMMUNICATIONS NETWORK, AND A METHOD OF IDENTIFYING A HANDOVER TARGET FEMTOCELL BASE STATION

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as small cells, microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell. A typical coverage range is tens of metres.

Femtocell base stations have auto-configuring properties so as to support plug- and play deployment by users, for example in which femto base stations may integrate themselves into an existing macrocell network so as to connect to the core network of the macrocell network.

Femtocell base stations are intended primarily for users belonging to a particular home or office. Femtocell base stations may be closed access or open access. In femtocell base stations that are closed access, access is restricted only to registered users, for example family members or particular groups of employees. In femtocell base stations that are open access, other users may also use the femtocell base station, subject to certain restrictions to protect the Quality of Service received by registered users.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications. An alternative to such a wired broadband backhaul is to have a wireless backhaul.

Femtocell base stations are sometimes referred to as femtos.

Handover of a user terminal from connection to one cell to connection to another cell is common in cellular telecommunications systems. Handovers may be from macrocell base station to macrocell base station, from femto to femto, from femto to macrocell base station ("Handout") and from macrocell base station to femto ("Hand-in").

Handover, in particular, of a user terminal from connection to a macrocell base station to connection with a femto ("Hand-in") poses challenges in terms of target disambiguation, in other words, uniquely identifying the target femto for handover from multiple candidates. Lack of information of the identity of the best handover candidate is the heart of the target "ambiguity" problem. This problem gets worse as the density of femtos in any given area increases. Specifically, this problem arises as many femtos have to share just a few primary scrambling codes, so there is much scrambling code reuse, meaning that a primary scrambling code does not identify the femtocell. Even when limited to within the coverage area of a single macrocell, there may be many target femto candidates.

In known systems, messages passed from the macrocell base station towards the core network during preparation for handover do not enable the best target femto to be uniquely identified. The user terminal receives paging signals from various femtos and reports to the macrocell base station the scrambling code of the best quality received signal and the best target femto. However, that code is used by many other femtos also, so does not clearly identify to the macrocell base station which is the best target femto.

Some methods of macrocell base station to femto handover (hand-in) are known. In some known approaches, the femto is closed access, meaning that only a few user terminals are permitted to connect to the femto and these user terminals are listed in an access control list according to their unique identifiers, namely their respective International Mobile Subscriber Identity (IMSI). The list of handover candidates is then greatly reduced as the only femtos that may be considered as target candidates are those having that user terminal on their respective access control list as a permitted user.

Where the femtos are open access, femtos do not have an access control list. However it is possible to determine handover candidates using characteristics of the handover source macrocell and also characteristics of femtos. Specifically, only femtos are selected that are within the macrocell and have the same scrambling code as that identified by the user terminal and informed to the macrocell base station. For example, in a system where femtos use six scrambling codes distributed in equal proportions among the femtos, then the size of the candidate list is correspondingly reduced six-fold. Handover is then attempted to all of the femtos that remain on the candidate list. Once one of these successfully takes on the connection with the user terminal, that successful femto informs the network, which then instructs all of the other femtos on the list to cease their handover acceptance attempts. As there are usually many femtos on the reduced list of handover candidates, resources are wasted in the multiple unsuccessful handover attempts that are made.

SUMMARY

The reader is referred to the appended independent claims. Some preferred features are laid out in the dependent claims.

An example of the present invention is a method of identifying a handover target femtocell base station from among multiple femtocell base stations, the method comprising:

(a) measuring a characteristic of the handover target femtocell base station to provide a first measured value of the characteristic;

(b) then identifying as handover candidate femtocell base stations a first set of femtocell base stations all having that first characteristic value;

(c) then changing the characteristic of selected femtocell base stations in the first set;

(d) then measuring the characteristic of the handover target femtocell base station to provide a further measured value of the characteristic;

(e) then identifying, as a reduced set of handover candidate femtocell base stations, each femtocell base station in the first set having the further measured value of the characteristic;

(f) then checking whether the number of femtocell base stations in the reduced set of handover candidate femtocell base stations is one, and upon determining that the number of femtocell base stations in the reduced set is greater than one, taking the reduced set as the first set in repeating steps (c), (d) (e) and (f).

The characteristic is preferably primary scrambling code.

In preferred embodiments the time varying values of the characteristic are sent by a handover source base station controller to a femto-gateway in order for the femto-gateway to identify the target femto.

Some preferred embodiments provide a solution to macro to femto handover ("hand-in").

In preferred embodiments, the unique handover target femto can be identified among a large number of femtos residing in a macrocell but sharing few primary scrambling codes.

BRIEF DESCRIPTION OF THE DRAWINGS

Embodiments of the present invention will now be described by way of example and with reference to the drawings, in which.

DETAILED DESCRIPTION

We now describe a network including femtocell base stations then look in greater detail at macrocell base station to femto handover, particularly how to uniquely identify the target femto where primary scrambling codes are shared by multiple femtos.

Network

Figure 1:
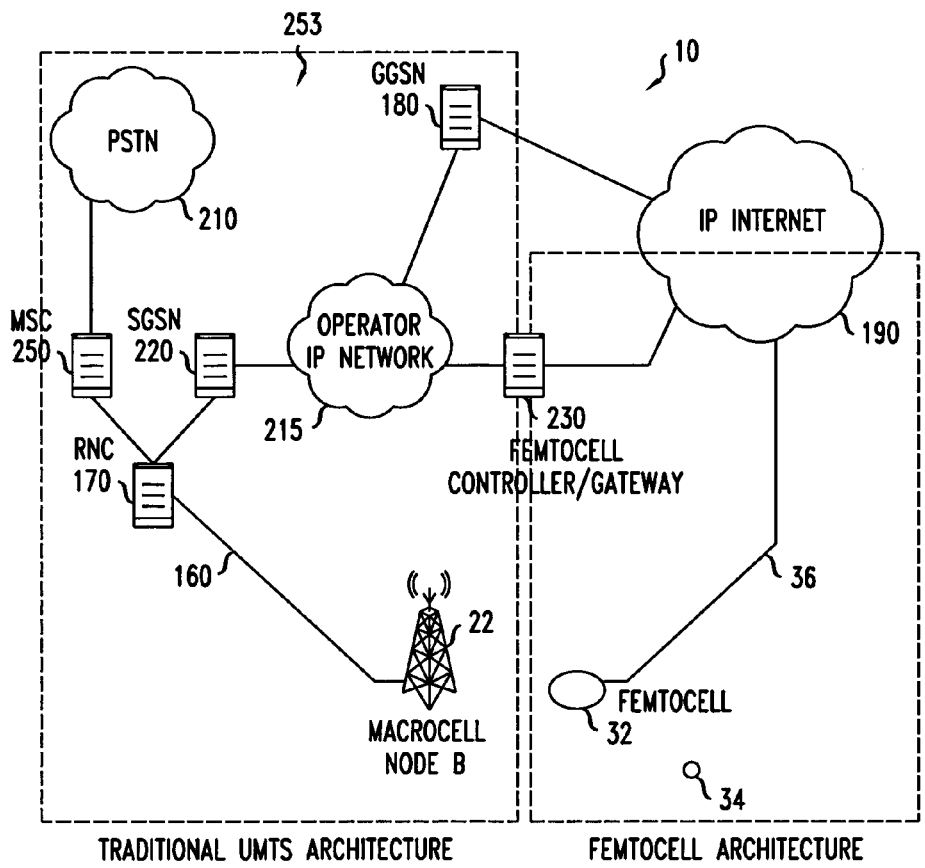
FIG. 1 is a diagram illustrating a wireless communications network according to a first embodiment of the present invention.
Figure 2:
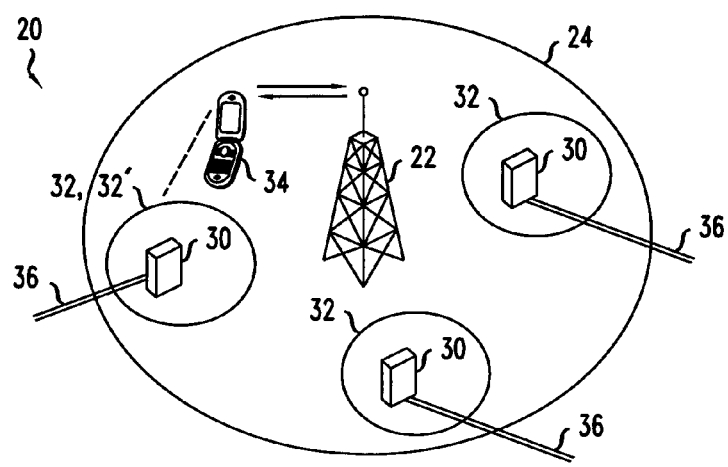
FIG. 2 is a diagram illustrating an example femtocell base station deployment within one macrocell shown in FIG. 1.

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 1 and 2 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 1, the network 10 is managed by a radio network controller, RNC, 170. The radio network controller, RNC, 170 controls the operation, for example by communicating with macrocell base stations 22 via a backhaul communications link 160. The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network such as a public switched telephone network (PSTN) 210. For packet-switched traffic, the network controller 170 communicates with serving general packet radio service support nodes (SGSNs) 220 and a gateway general packet radio support node (GGSN) 180. The GGSN then communicates with a packet-switch core 190 such as, for example, the Internet.

The MSC 250, SGSN 220, GGSN 180 and operator IP network constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 30. These connections to the femtocell controller/gateway 230 are broadband Internet Protocol connections ("backhaul") connections.

In FIG. 2, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 2, the user of mobile terminal 34 is a preferred user of the nearest 32' of the femtocells 32.

As shown in FIG. 2, the femtocell base stations 30 are connected via the broadband Internet Protocol connections ("backhaul") 36 to the core network (not shown in FIG. 2) and hence the rest of the telecommunications "world" (not shown in FIG. 2). The "backhaul" connections 36 allow communications between the femtocell base stations 30 through the core network (not shown). The macrocell base station is also connected to the core network (not shown in FIG. 2).

Identifying the Femtocell Base Station that is to be the Handover Target

Figure 3:
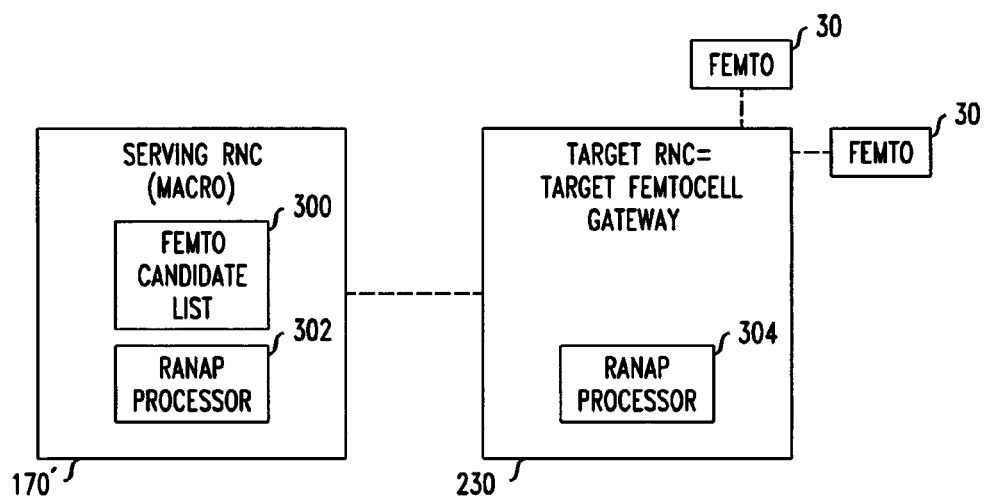
FIG. 3 is a diagram illustrating a serving RNC and a femto gateway of the network shown in FIGS. 1 and 2.

As shown in FIG. 3, the serving RNC 170' of the macrocell base station 22 to which the voice or data call is connected includes a femto handover candidate list 300 and a Radio Access Network Application Part (RANAP) processor 302. The femto gateway 230, which appears as an RNC interface to the core network, is connected to multiple femtos 30 and also includes a RANAP processor 304. Operation is described below.

Process

The process of reducing the number of femtos in the candidate list is repeated (iterated) until the best handover target is uniquely identified. The process involves varying Primary Scrambling Codes over time to provide information to uniquely identify the best handover target femto.

Informed by measurement reports provided by a user terminal as to signal strength of neighbouring cells, the source RNC 170' may decide to seek to handover the connection with the user terminal from the macrocell base station to a femto. Upon making that decision, the source RNC sends a handover request, specifically a RANAP relocation request, to the target femto gateway, which acts as a target RNC.

If the femto candidate list has greater than one candidate, then the target femto gateway 23 reacts by instructing a subset of the femto candidates to change primary scrambling code in a predetermined way, and a relocation failure message is sent from the target femto gateway to the source RNC. A further measurement report from the user terminal is made causing the candidate list to be reduced. Steps of user terminal measurement and primary code variation are repeated until the candidate list is of just one candidate, at which time the target femto is uniquely identified and so the handover proceeds.

An example is provided below.

Four Candidate Example

Figure 4:
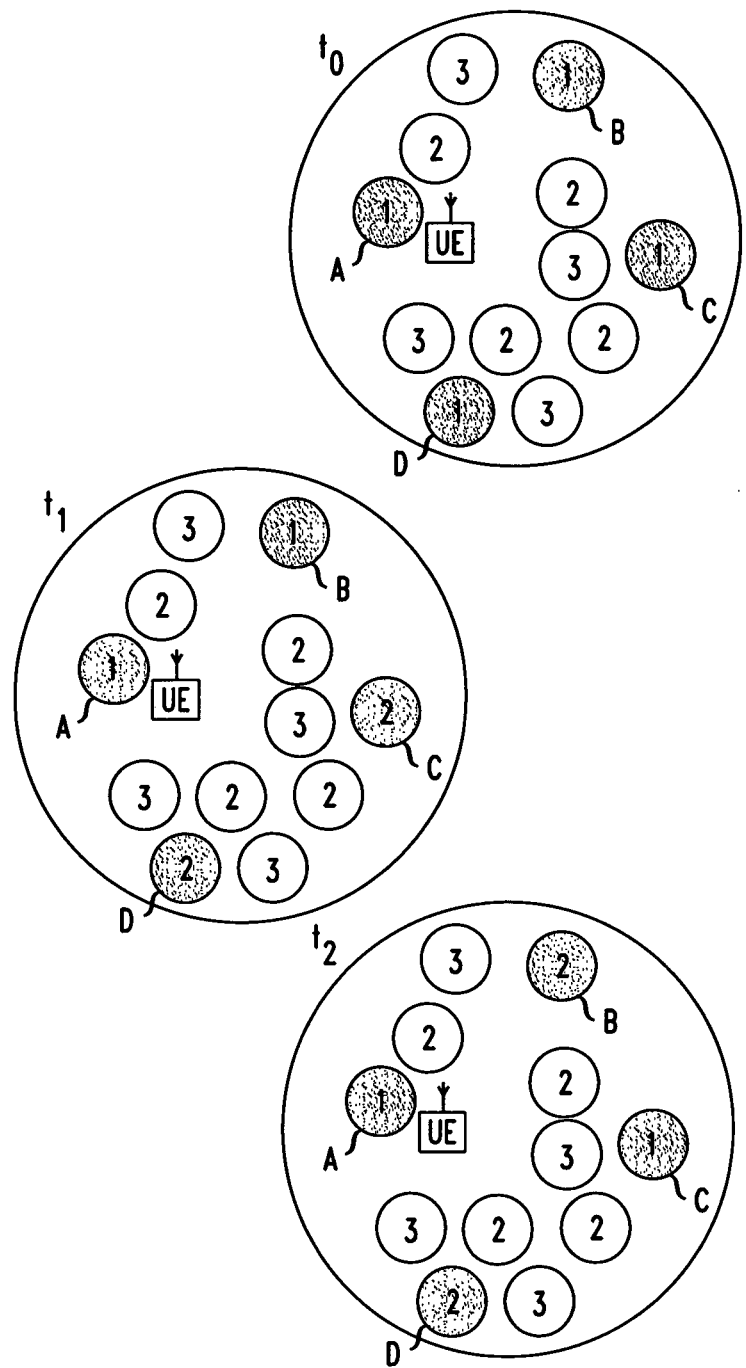
FIG. 4 is a diagrammatic illustration of how the scrambling codes of handover target candidate femtos are changed over time in order to uniquely identify the best target.

As shown in FIG. 4, consider as an example a macrocell coverage area within which twelve femtos are situated, those femtos sharing three Primary Scrambling Codes (PSCs). As shown in FIG. 4, at a first time instance $t_o$, four femtos A, B, C, D use the first PSC1, another four femtos use the second PSC2, and another four femtos use the third PSC3.

It has been identified, by radio measurements taken by the user terminal 34 that is in call connection with the macrocell base station 22, that the PSC of the base station which is the best handover target is PSC1. However the issue is then to identify which of the four femtos A, B, C, D in the macrocell that use PSC1 is the best handover target.

The PSCs of selected handover candidates are changed over time, in such a way as to enable the best handover candidate to be uniquely identified. In this example, as shown in FIG. 4 at a time $t_1$, femto C and femto D are both changed to PSC2. As shown in FIG. 4, then at a subsequent time $t_2$, femto B is changed to PSC2 and femto C is changed back to PSC1. Thus at times $t_0$, $t_1$, $t_2$, the sequences of scrambling codes for the four candidate femtos areas are as shown in Table 1. This enables the femto handover target to be uniquely identified.

TABLE 1

| Femto | PSC at time $t_0$ | PSC at time $t_1$ | PSC at time $t_2$ |
|---|---|---|---|
| A | PSC1 | PSC1 | PSC1 |
| B | PSC1 | PSC1 | PSC2 |
| C | PSC1 | PSC2 | PSC1 |
| D | PSC1 | PSC2 | PSC2 |

Figure 5A:
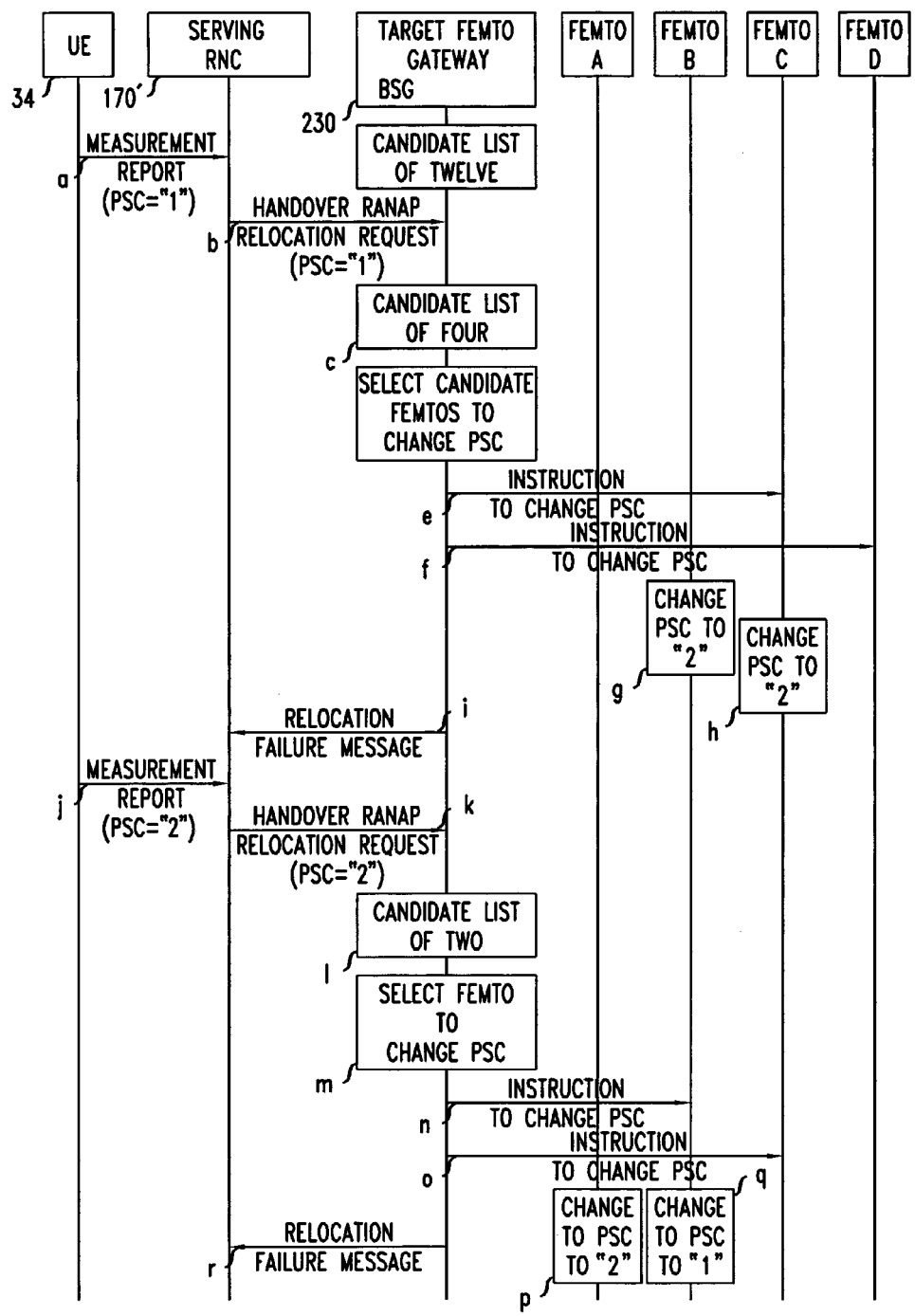
FIG. 5 is a message sequence diagram illustrating operation of the serving RNC and the femto gateway and communications with the user terminal and femto handover target candidates in the example shown in FIG. 4.
Figure 5B:
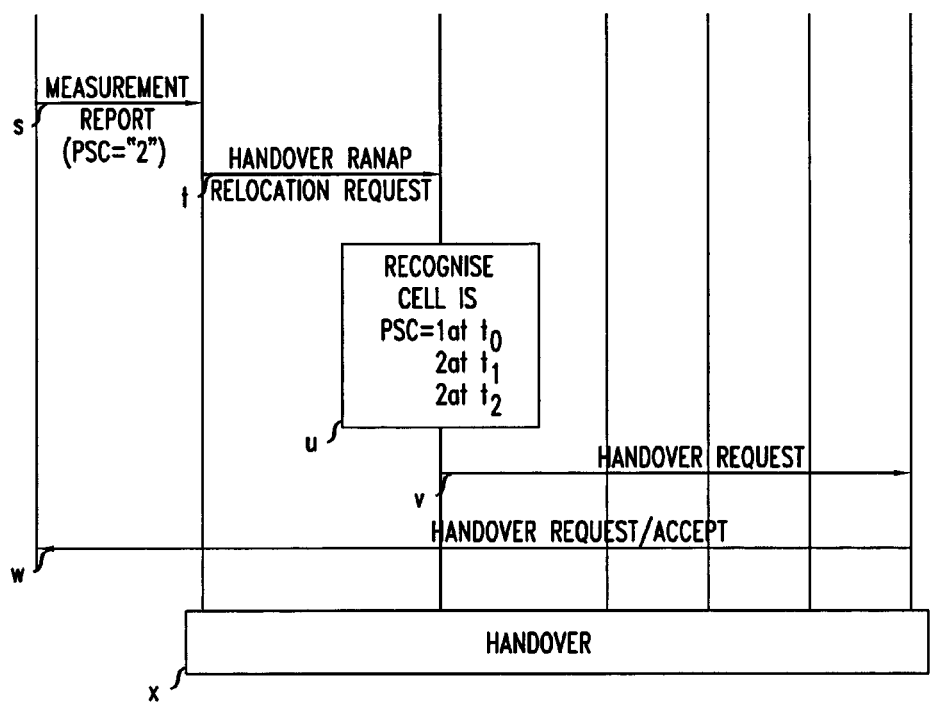

As shown in FIG. 5, the user terminal 34 in the coverage area of the macrocell base station (not shown in FIG. 5) sends (step a) a measurement report via the macrocell base station to its serving RNC 170' which is the source RNC as regards handover. The measurement report includes an identifier of the PSC of the best handover candidate as being PSC1.

A handover request including an identifier of PSC1 is sent (step b) to the target femto gateway 230. The femto gateway recognises PSC1 as one of the few primary scrambling codes reserved for femtos. In consequence, the femto gateway determines (step c) that of the twelve candidate femtos in the macrocell coverage area, only the four A, B, C, D then using PSC1 are still candidates.

The gateway 230 then selects which femtos are to change primary scrambling code so as to aid handover target identification. In this example, femto C and D are selected (step d) and instructions are sent (step e, f) to each of them to change to PSC2. Femto C changes (step h) to PSC2. Femto D changes (step g) to PSC2. As no unique handover target femto is identified the gateway then sends (step i) a relocation failure message to the serving RNC 170'

A further measurement report is then received (step j) by the RNC 170' from the user terminal 34. This further measurement report includes an identifier of the PSC of the best handover candidate as being PSC2. A handover request including an identifier of PSC2 is sent (step k) to the target femto gateway 230. In consequence, the femto gateway determines (step l) that of the four previously-identified candidate femtos A, B, C, D, only two, namely C and D, are then using PSC2 so are still candidates.

The gateway 230 then selects which of the femtos are to change primary scrambling code. In this example, femto B and C are selected (step m) and instructions are sent (step n, o) to each of them to change to PSC2. Femto B changes (step p) to PSC2. Femto C changes (step q) to PSC1. As no unique handover target femto was identified in that cycle, the gateway sends (step r) a relocation failure message to the serving RNC 170'.

The next measurement report from the user terminal identifies (step s) the PSC of the best handover candidate femto as PSC2. A handover request including an identifier of PSC2 is sent (step t) to the target femto gateway 230

The gateway 230 identifies (step u) from the reduced candidate list of femto C and Femto D, that only femto D then uses PSC2, so femto D is the uniquely identified candidate for handover. In other words, consistent with the measurement reports at those three times $t_0$, $t_1$, $t_2$, only femto D had the PSC1 at $t_o$, PSC2 at $t_1$ and PSC1 at $t_3$. The gateway 230 then sends (step v) a handover request (namely a RANAP relocation request) to femto D. Femto D replies (step w) with a handover request accept message. Handover (step x) is then undertaken.

Minimising Impact on Served User Terminals

Whilst varying the PSC of a femto in seeking to identify the best handover target for a macro-connected user terminal, it is desirable for detrimental effects to be minimised on other user terminals that are either camped in idle mode on the femto or in active connection with the femto.

Figure 6:
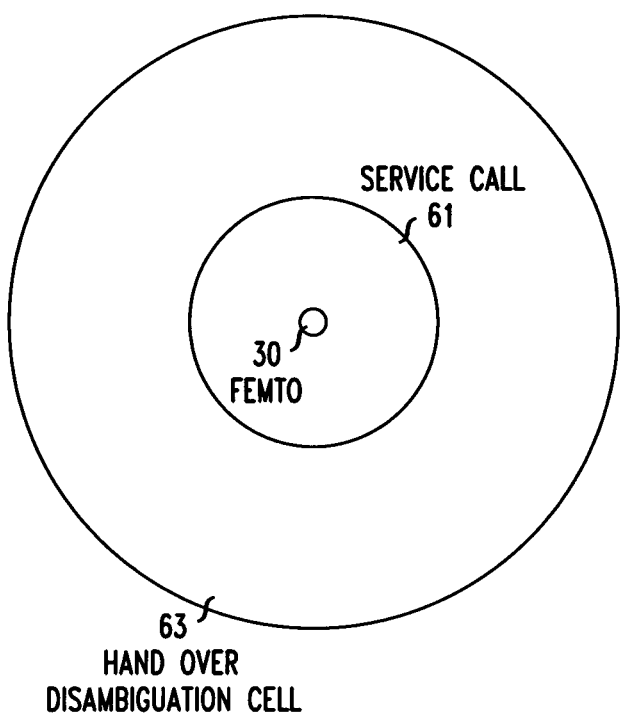
FIG. 6 is an illustration of a femtocell base station having two radiating cells, one for handover target identification and the other for voice/data services.

In the example described above, this is done by each femto generating two different, but overlapping, coverage areas. As shown in FIG. 6, there is a service coverage area 61 that provides normal cellular service and a handover assisting coverage area 63 which assists by cycling through PSCs under the control of the femto gateway. In use, once the target femto has been uniquely identified, a user terminal is handed over from the macrocell base station to the handover assistance cell 63. After a short time, the user terminal is then handed over to the regular service cell 61. Moving between the two cells is controlled by setting cell reselections and handover parameters appropriately, and in some examples, also setting the relative transmit powers of the two coverage areas 61 and 63. This means that hand-in from the macro to the femto service cell 61 is a two-stage process: first handover to the handover assistance cell 63 then handover from there to the service cell 61.

An alternative is that before its Primary Scrambling Code (PSC) is changed, the neighbour list of a femto is updated to include the newly assigned PSC. The femto then sends a command over its broadcast channel for connected user terminals to reread the PSC so as to be up to date. Then when the PSC of the femto actually changes, user terminals in idle mode switch to camping on that femto using the new PSC and all user terminals in active mode reconfigure their radio resources, by way of a physical channel reconfiguration, to use the new PSC in their connections with that femto. Essentially from the perspective of a user terminal, these processes appear like a handover or relocation.

Some Other Examples

By way of a further example, if six primary scrambling codes are reserved for femtos in a network, and there are (6 to the power of 5=) 776 femtos, by appropriate changing of primary scrambling codes over time such that each femto has a unique sequence of primary scrambling codes, unique identification of the correct target femto is possible with just five handover request rejections by the target femto gateway acting as an RNC.

In an example which consists of a macrocell having a radius of 1 kilometre and one femto per 500 square metres, there are 6280 femtos inside the macrocell. As this is less than 7776, with only five handover request rejections the target femto is uniquely identified.

In an example network, there are 512 different primary scrambling codes available but typically few are allocated to femtos. These few are a common set of PSCs reserved for femtos in any macrocell. Alternatively the set of primary scrambling codes allocated to femtos can be specific to each macrocell.

The particular examples described above involve altering, at times, primary scrambling codes. Another configuration parameter, or other configuration parameters may be used in addition, or instead, in order to uniquely identify the handover target. For example, carrier frequency may be used.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of identifying a handover target femtocell base station from among multiple femtocell base stations, the method comprising:
   measuring a characteristic of the handover target femtocell base station to provide a first measured value of the characteristic;
   then identifying as handover candidate femtocell base stations a first set of femtocell base stations all having that first characteristic value;
   then changing the characteristic of selected femtocell base stations in the first set;
   then measuring the characteristic of the handover target femtocell base station to provide a further measured value of the characteristic;
   then identifying, as a reduced set of handover candidate femtocell base stations, each femtocell base station in the first set having the further measured value of the characteristic;
   then checking whether the number of femtocell base stations in the reduced set of handover candidate femtocell base stations is one, and upon determining that the number of femtocell base stations in the reduced set is greater than one, taking the reduced set as the first set in repeating the changing, measuring, identifying each femtocell base station and checking.

2. A method according to claim 1, in which the characteristic is primary scrambling code.

3. A method according to claim 1, in which the multiple femtocell base stations all lie within a macrocell of a cellular network, and there are fewer primary scrambling code values allocated to the femtocell base stations than the number of femtocell base stations.

4. A method according to claim 1, in which the measuring steps each comprise the user terminal measuring the characteristic.

5. A method according to claim 1, in which the characteristic value is forwarded by a serving radio network controller to a femto-gateway in a handover request message.

6. A method according to claim 5, which includes, upon determining that the number of femtocell base stations in the reduced set is greater than one, the femto-gateway sending a message informing of handover failure to the serving radio network controller.

7. A method according to claim 1, including a handover of call connection from a macrocell base station to the identified handover target femtocell base station.

8. A method according to claim 1, in which the characteristic is changed in a first cell of the femtocell base station in response to measurements made by a user terminal, whilst connections to other user terminals are maintained in a second cell of the femtocell base station.

9. A method according to claim 1, in which in femtocell base stations in which the characteristic is to be changed, connected user terminals are commanded to switch to use of the new characteristic, then the characteristic is changed to the new value.

10. A femto-gateway configured to identify a handover target femtocell base station from among multiple femtocell base stations, the femto-gateway comprising:
    one or more processors programed to:
    receive a first measured value of a characteristic of the handover target femtocell base station,
    identify as handover candidate femtocell base stations a first set of femtocell base stations all having that first characteristic value,
    change the characteristic of selected femtocell base stations in the first set,
    receive a further measured value of the characteristic of the handover target femtocell base station,
    identify as a reduced set of handover candidate femtocell base stations each femtocell base station in the set having the further measured value of the characteristic,
    check whether the number of femtocell base stations in the reduced set of handover candidate femtocell base stations is one, and, upon determining that the number of femtocell base stations in the reduced set is greater than one, to repeat changing, receiving, identifying each femtocell base station, and checking,taking the reduced set as the first set.

11. A femto-gateway according to claim 10, in which the multiple femtocell base stations all lie within a macrocell of a cellular network, and there are fewer possible values allocated to the femtocell base stations than the number of femtocell base stations.

12. A femto-gateway according to claim 10, in which the measured values are received from a the user terminal.

13. A femto-gateway according to claim 10, wherein the one or more processors is configured to send a message informing of handover failure to a serving radio network controller of the connection for handover upon determining that the number of femtos in the reduced set is greater than one.

14. A network comprising the femto-gateway according to claim 10, and a femtocell base station in which the characteristic is changed in a first cell of the femtocell base station in response to measurements made by a user terminal, whilst connections to other user terminals are maintained in a second cell of the femtocell base station.

15. A network comprising the femto-gateway according to claim 10, and a femtocell base station in which the characteristic is to be changed, in which, in use, connected user terminals are commanded to switch to use of the new characteristic value, then the characteristic value is changed to the new value.

* * * * *